United States Patent
Wheeler et al.

(10) Patent No.: US 6,445,992 B2
(45) Date of Patent: *Sep. 3, 2002

(54) IDLE DRIVE TORQUE CONTROL FOR AUTOMATED VEHICLE DRY MASTER CLUTCH

(75) Inventors: Robert Stanley Wheeler, Preston; Alfred John Richardson, Knutsford, both of (GB)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/845,075

(22) Filed: Apr. 27, 2001

(30) Foreign Application Priority Data

May 5, 2000 (GB) .............................. 0010785

(51) Int. Cl.$^7$ .............................. B60K 41/02
(52) U.S. Cl. .................. 701/67; 477/180; 477/166; 477/176; 74/168; 192/35; 192/93 A
(58) Field of Search .................. 701/67; 477/175, 477/180, 174, 166, 78, 176; 74/335, 336 R, 168; 192/35, 93 A

(56) References Cited

U.S. PATENT DOCUMENTS

| | | | |
|---|---|---|---|
| 4,081,065 A | 3/1978 | Smyth et al. | 192/0.076 |
| 4,361,060 A | 11/1982 | Smyth | 74/866 |
| 4,576,265 A | 3/1986 | Kumura et al. | 192/0.055 |
| 4,595,986 A | 6/1986 | Daunbenspeck | 364/424.1 |
| 4,646,891 A | 3/1987 | Braun | 192/0.032 |
| 4,700,823 A | 10/1987 | Winckler | 192/107 |
| 4,838,397 A | 6/1989 | Kurihara et al. | 192/0.044 |
| 4,860,861 A | 8/1989 | Gooch et al. | 192/3.26 |
| 5,097,724 A | 3/1992 | Braun | 74/866 |
| 5,275,267 A | 1/1994 | Slicker | 192/0.033 |
| 5,293,316 A | 3/1994 | Slicker | 364/424.1 |
| 5,314,050 A | 5/1994 | Slicker et al. | 477/171 |
| 5,337,868 A | 8/1994 | Liu et al. | 477/74 |
| 5,337,874 A | 8/1994 | Oltean et al. | 192/111 |
| 5,383,823 A | 1/1995 | Ward et al. | 447/86 |
| 5,393,274 A | 2/1995 | Smedley | 477/74 |
| 5,404,301 A | 4/1995 | Slicker | 364/424.1 |
| 5,411,124 A | 5/1995 | Olson | 192/103 |
| 5,441,137 A * | 8/1995 | Organek et al. | 192/35 |
| 5,441,462 A | 8/1995 | Chan | 477/74 |
| 5,485,904 A | 1/1996 | Organek et al. | 192/35 |
| 5,509,867 A | 4/1996 | Genise | 477/120 |
| 5,624,350 A * | 4/1997 | Bates | 477/78 |
| 5,630,773 A | 5/1997 | Slicker et al. | 477/176 |
| 5,738,609 A | 4/1998 | Jones et al. | 477/175 |
| 5,803,869 A * | 9/1998 | Jamzadeh et al. | 477/168 |
| 5,980,428 A | 11/1999 | Liu | 477/180 |
| 6,022,295 A | 2/2000 | Liu | 477/180 |
| 6,045,484 A | 4/2000 | Kosik et al. | 477/174 |
| 6,071,211 A * | 6/2000 | Liu et al. | 477/175 |

* cited by examiner

Primary Examiner—William A. Cuchlinski, Jr.
Assistant Examiner—Tuan C To
(74) Attorney, Agent, or Firm—Howard D. Gordon

(57) ABSTRACT

A control for a vehicle drive line system (10) including an automated vehicle dry master clutch (14) drivingly interposed in between a fuel-controlled engine (12) and the input shaft (20) of a mechanical transmission. When engaged in a start ratio and at sensed idle conditions (THL<REF and OS<REF), if the vehicle brake system (35 and 35C) is not applied, the engine (12) is commanded to generate an output torque ($T_{FW}$) equal to a selected idle drive torque ($T_{IDLE}$) at idle speed (ES=IDLE), the engine is commanded to rotate at idle speed, and the clutch is caused to engage with a torque capacity equal to the idled

31 Claims, 5 Drawing Sheets

IDLE DRIVE TORQUE CONTROL FOR AUTOMATED VEHICLE DRY MASTER CLUTCH

RELATED APPLICATIONS

This application is related to allowed, copending U.S. Ser. No. 09/195,093 filed Nov. 18, 1998 and entitled IDLE DRIVE TORQUE CONTROL FOR AUTOMATED VEHICLE MASTER CLUTCH, also assigned to EATON CORPORATION, assignee of this application.

BACKGROUND OF THE INVENTION

1. FIELD OF THE INVENTION

The present invention relates to controls for vehicular master dry friction clutches utilized in partially or fully automated mechanical transmission systems. In particular, the present invention relates to a control for a vehicle dry master clutch wherein, at idle conditions, with the vehicle brakes not applied, the master clutch is engaged to a relatively low idle drive torque torque transfer capacity.

2. DESCRIPTION OF THE PRIOR ART

Partially and fully automated vehicular mechanical transmission systems utilizing friction master clutches are known in the prior art, as may be seen by reference to U.S. Pats. No. 4,361,060; 4,595,986; 4,850,236; 4,648,290; 5,389,053; 5,487,004; 5,487,005 and 5,509,867, the disclosures of which are incorporated herein by reference.

Controls for automated friction master clutches, usually dry friction clutches, utilized in vehicular automated transmission systems are known, as may be seen by reference to U.S. Pats. No. 4,081,065; 4,646,891; 4,860,861; 5,275,267; 5,293,316; 5,314,050; 5,337,868; 5,337,874; 5,383,823; 5,393,274; 5,411,124; 5,404,301; 5,630,773; 5,624,350; 5,738,609; 5,964,330 and 6,045,484, the disclosures of which are incorporated herein by reference.

SUMMARY OF INVENTION

According to the present invention, a control for an automated master dry friction clutch is provided which utilizes the information available on industry standard electronic vehicular data links, such as data links conforming to the SAE J1922, SAE J1939 and/or ISO 11898 protocols and/or a brake system sensor, to provide improved clutch control and clutch functional features as compared to the prior art.

By sensing and controlling engine flywheel torque utilizing an electronically controlled engine connected to an industry standard data link (see U.S. Pat. No. 5,509,867, the disclosure of which is incorporated herein by reference), and controlling the engaged condition of a master friction clutch, a master dry clutch drive train system providing an "urge to move" at idle conditions when the vehicle brakes are not applied, is provided.

A system for providing an "urge to move" utilizing a wet clutch is disclosed in allowed, co-pending U.S. Ser. No. 09/195,093. That system, however, is not suitable for use with a dry clutch, as excessive slip and wear may occur with the vehicle brakes applied.

Accordingly, it is an object of the present invention to provide an improved control for a vehicle drive line including a master dry friction clutch which will provide an "urge-to-move" torque at idle conditions when the vehicle brakes are not applied.

This and other objects and advantages of the present invention will become apparent from a reading of the following description of the preferred embodiment taken in connection with the attached drawings.

DESCRIPTION OF THE PREFERRED EMBODIMENT

Figure 1:
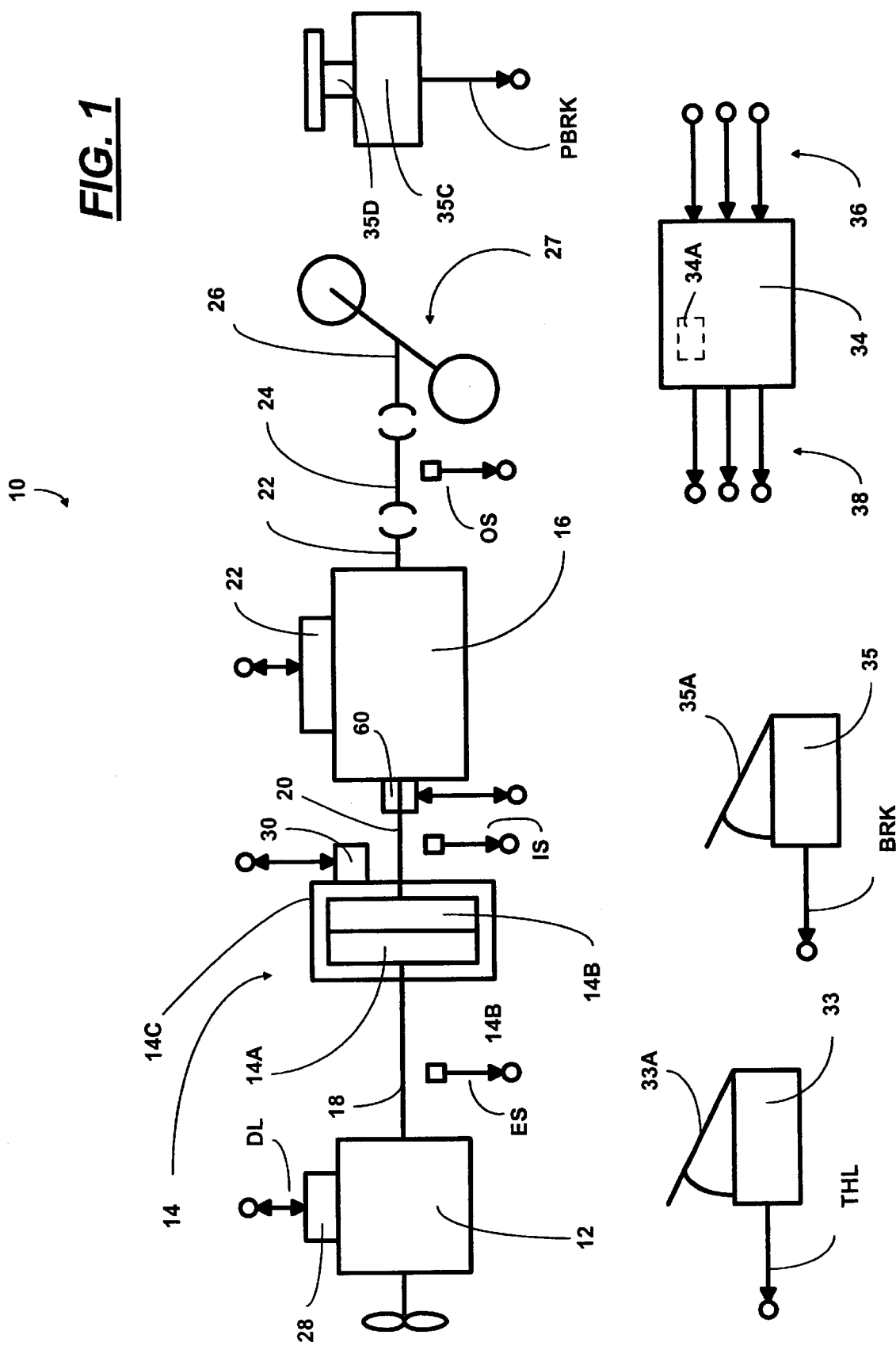
FIG. 1 is a schematic illustration of a vehicular automated mechanical transmission system advantageously utilizing the idle drive torque master clutch control of the present invention.

A vehicular automated mechanical transmission system 10 advantageously utilizing the idle drive torque master clutch control of the present invention is schematically illustrated in FIG. 1.

System 10 includes a fuel-controlled engine 12, a dry master friction clutch 14 and a multiple-speed mechanical transmission 16. Engine 12 is typically a diesel or gasoline engine and has an output member or crank shaft 18 which drives friction discs 14A of clutch 14, which are biased in engagement with friction discs 14B, rotationally fixed to input shaft 20 of transmission 16.

Transmission 16 may be of the simple or compound type, as illustrated in U.S. Pat. No. 5,370,561, the disclosure of which is incorporated herein by reference. Transmission 16 has an output shaft 22, which drives a drive shaft 24 connected to the input 26 of a vehicle drive axle mechanism 27.

An engine controller 28, which is preferably electronically and microprocessor-controlled, is provided for controlling fueling of the engine and for providing output information to an electronic data link DL, preferably conforming to the industry standard SAE J1939 or a comparable protocol. System 10 also includes a clutch actuator 30 for controlling operation of clutch 14 and a transmission actuator 32 for controlling operation of transmission 16.

A sensor 33 is provided for sensing throttle 33A position and providing a signal THL indicative thereof. A sensor 35 is provided for sensing operation of the vehicle foundation brake pedal 35A and providing a signal BRK indicative thereof. A sensor 35C also may be provided for sensing activation of the vehicle parking brakes 35D and providing a signal PBRK indicative thereof. The foundation brakes controlled by pedal 35A and the parking brakes 35D, if provided, are the vehicle brake system. Throttle position and/or brake system operation information also may be obtained from the data link.

Electronic engines controlled by an SAE J1939 or similar data link typically have four modes of operation, (i) fuel according to throttle position, (ii) fuel according to requested engine speed, (iii) fuel according to requested gross engine torque, and (iv) fuel not to exceed a requested maximum engine speed and gross engine torque.

A microprocessor-based control unit 34 is provided for receiving input signals 36 and processing same according to control logic to generate command output signals 38 to the system actuators. The ECU may be separate or integral with the engine controller. The various controllers, sensors and/or actuators may communicate over a data link conforming to an industry standard protocol, such as SAE J1939 or the like.

Suitable sensors, such as sensors for sensing engine speed ES, input shaft speed IS and/or output shaft speed OS, and actuators are known to those of ordinary skill in the art and examples thereof, not intended to be limiting, may be seen by reference to U.S. Pats. No. 4,361,060; 4,873,881; 4,974,468; 5,135,218; 5,279,172; 5,305,240; 5,323,669; 5,408,898; 5,441,137; 5,445,126; 5,448,483 and 5,481,170.

Clutch 14 is defined as a "dry" clutch, as the friction members thereof, 14A and 14B, are not exposed to liquid for heat transfer and/or lubrication purposes. In the illustrated embodiment, the clutch friction members are contained within a housing 14C.

As is known (see aforementioned U.S. Pat. No. 5,509,867), a data link conforming to the SAE J1939 protocol or a comparable protocol, transmits information by which engine output torque (also called "flywheel torque") may be read or determined. These data links also allow a command to the engine to adjust fueling such that a particular engine speed and/or a particular engine torque is achieved. By utilizing this information and engine control capability, the master clutch 14 may be controlled to provide enhanced system performance.

Figure 2:
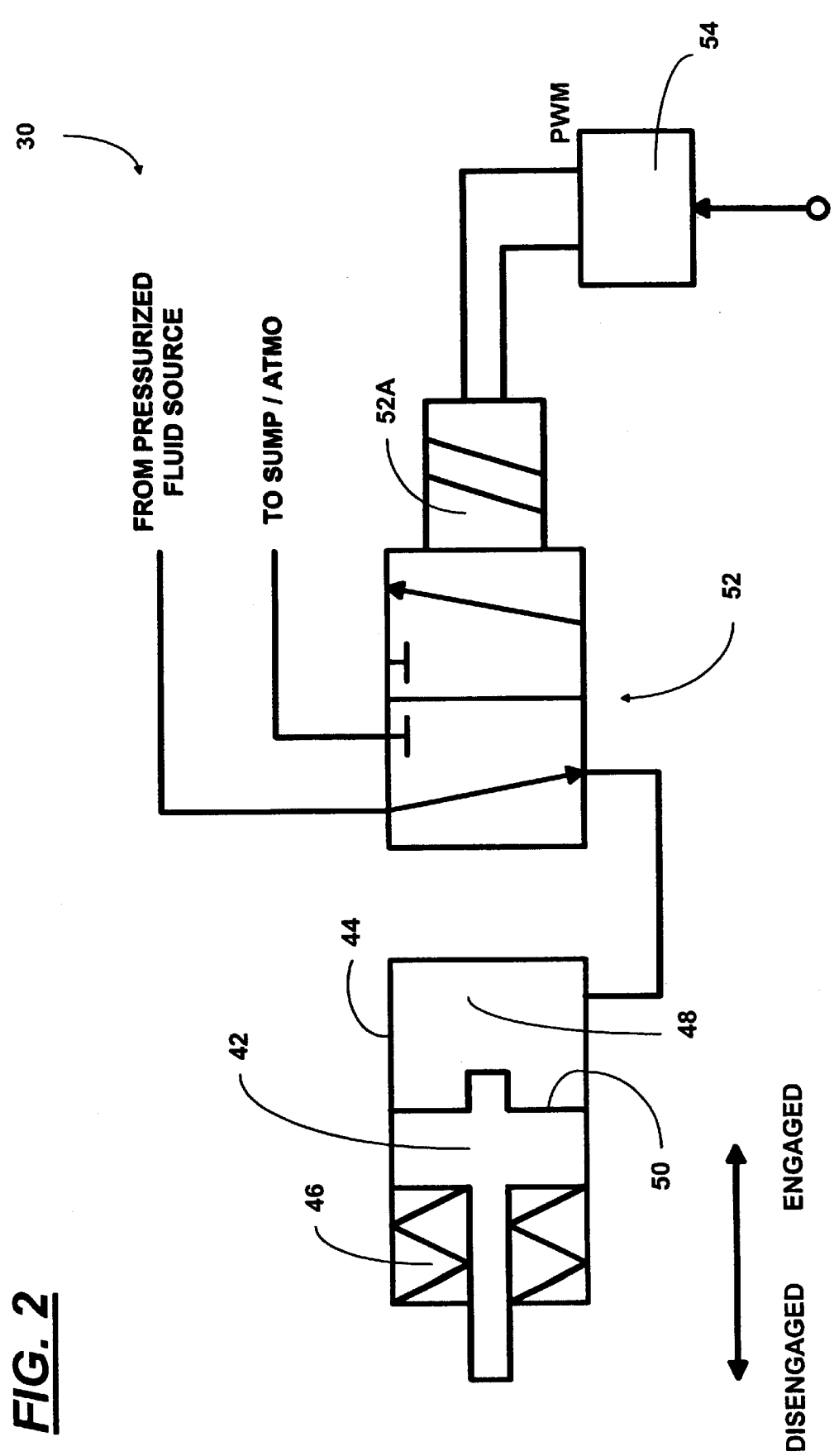
FIG. 2 is a schematic illustration of a pressurized fluid-actuated control mechanism for controlling the engaged condition of a vehicular master clutch.

A fluid pressure-operated clutch actuator assembly 30 is schematically illustrated in FIG. 2. A clutch operator piston 42 is received in a cylinder 44 and is biased in the disengaging direction by springs 46. Pressurized fluid, such as a hydraulic fluid or pressurized air, introduced into chamber 48 will act on piston face 50 to move the piston 42 in the engaged direction against the bias of the springs. A two-position, three-way, solenoid-controlled valve 52 is provided to selectively pressurize and exhaust chamber 48. A valve controller 54 responding to control signals from system controller 34 controls energizing of the solenoid 52A of valve 52, preferably by pulse width modulation (PWM).

Although a pressurized fluid-type actuator assembly 30 is illustrated, the present invention also is applicable to clutch controls using other types of clutch actuators, such as ball ramp actuators or the like (see U.S. Pats. No. 5,441,137 and 5,485,903, the disclosures of which are incorporated herein by reference).

The structure of a typical dry master friction clutch 14 may be seen by reference to aforementioned U.S. Pats. No.4,081,065; 5,393,247 and 5,964,330, and to U.S. Pats. No. 5,803,223; 5,803,224 and 6,045,484. Briefly, the engine output 18, typically a dampened flywheel, is connected to the transmission input shaft 20 by the engageable and disengageable friction discs 14A and 14B. The clutch 14 is contained within a housing 14C, which is attached to the forward end of the transmission housing.

As is well known, the discs are biased into frictional engagement by springs and are movable to positions of full or partial disengagement by a release member operated by piston 42.

System 10 also may include an inertia brake, also known as an input shaft brake or upshift brake 60, for decelerating or stopping the input shaft 20 for more rapid upshifting. Inertia brakes are known, as may be seen by reference to U.S. Pats. No. 5,086,659 and 5,713,445.

Applicants have discovered that, at engine idle speed (about 850 to 900 RPM) with the transmission engaged in a low ratio, such as first gear, it is desirable that the engine generate at the flywheel, and the master clutch be slightly engaged to transfer, a small amount of torque sufficient to cause slow or creeping movement of the vehicle if the vehicle brakes are not applied. This will provide a mode of operation similar to that expierienced by drivers of passenger automobiles equipped with torque converter-type transmissions.

The advantages of such a provision for an "urge-to-move" feature in a drive line and automatic friction master clutch control is that the vehicle will feel and act like a familiar passenger car equipped with an automatic transmission, the vehicle may be maneuvered at slow speeds using the brake pedal only, and vehicle launches will be quicker with less lurch, as the system backlashes have been taken up.

The amount of flywheel or output torque generated by the engine at idle speed, and transferable by the clutch in the "urge-to-move" engagement condition (i.e., the idle drive torque) should be sufficient to allow creeping if the brakes are not applied.

To prevent damage to the dry clutch 14 due to slippage when the brakes are applied, the clutch will be fully or substantially disengaged if operation of the vehicle brake system is sensed. It is understood that a very light application of the foundation or parking brakes may be considered as not being an application of the vehicle brake system.

Figure 4:
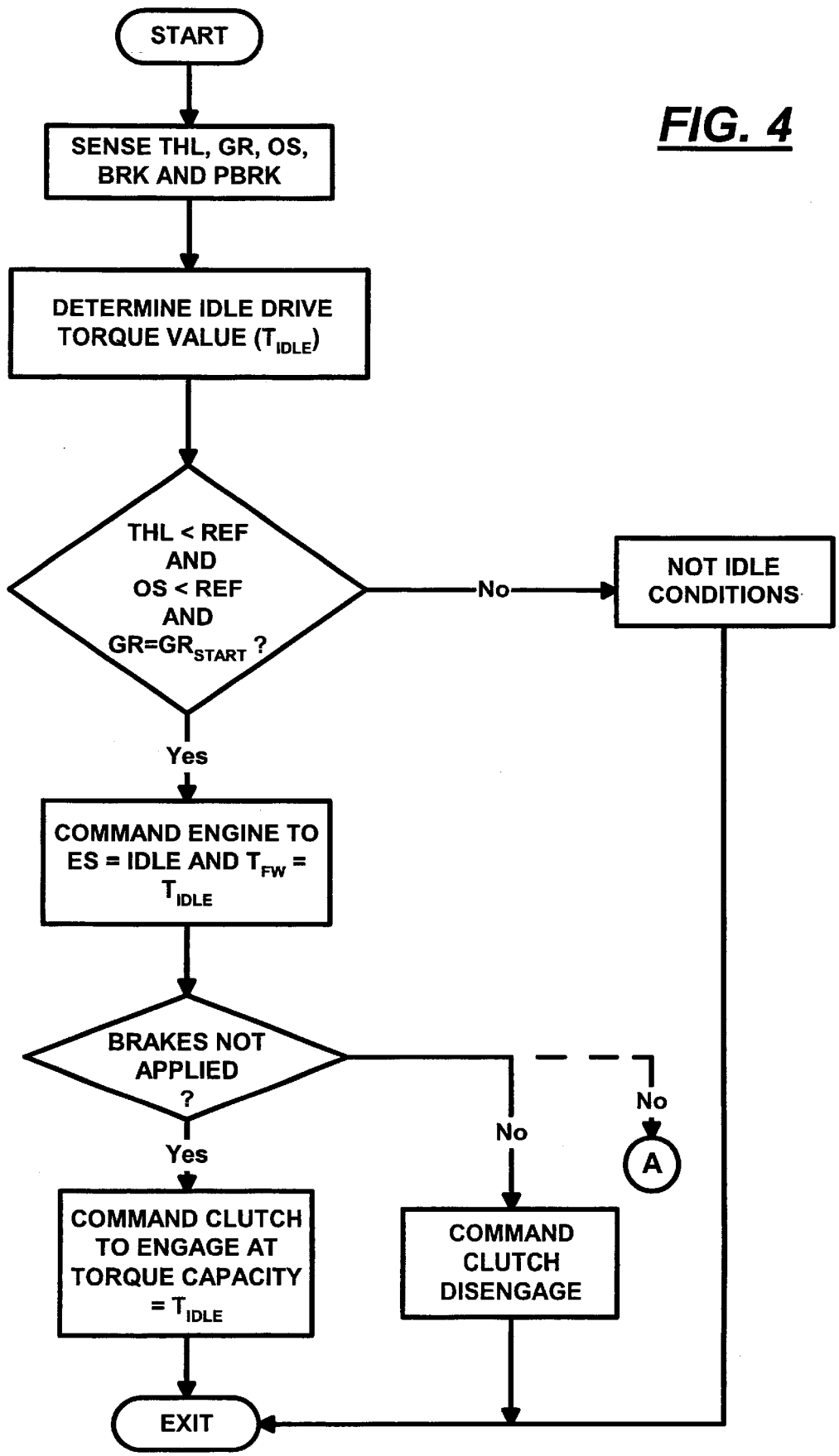
FIG. 4 is a schematic illustration, in flow chart format, of the idle drive torque master clutch control logic of the present invention.
Figure 4A:
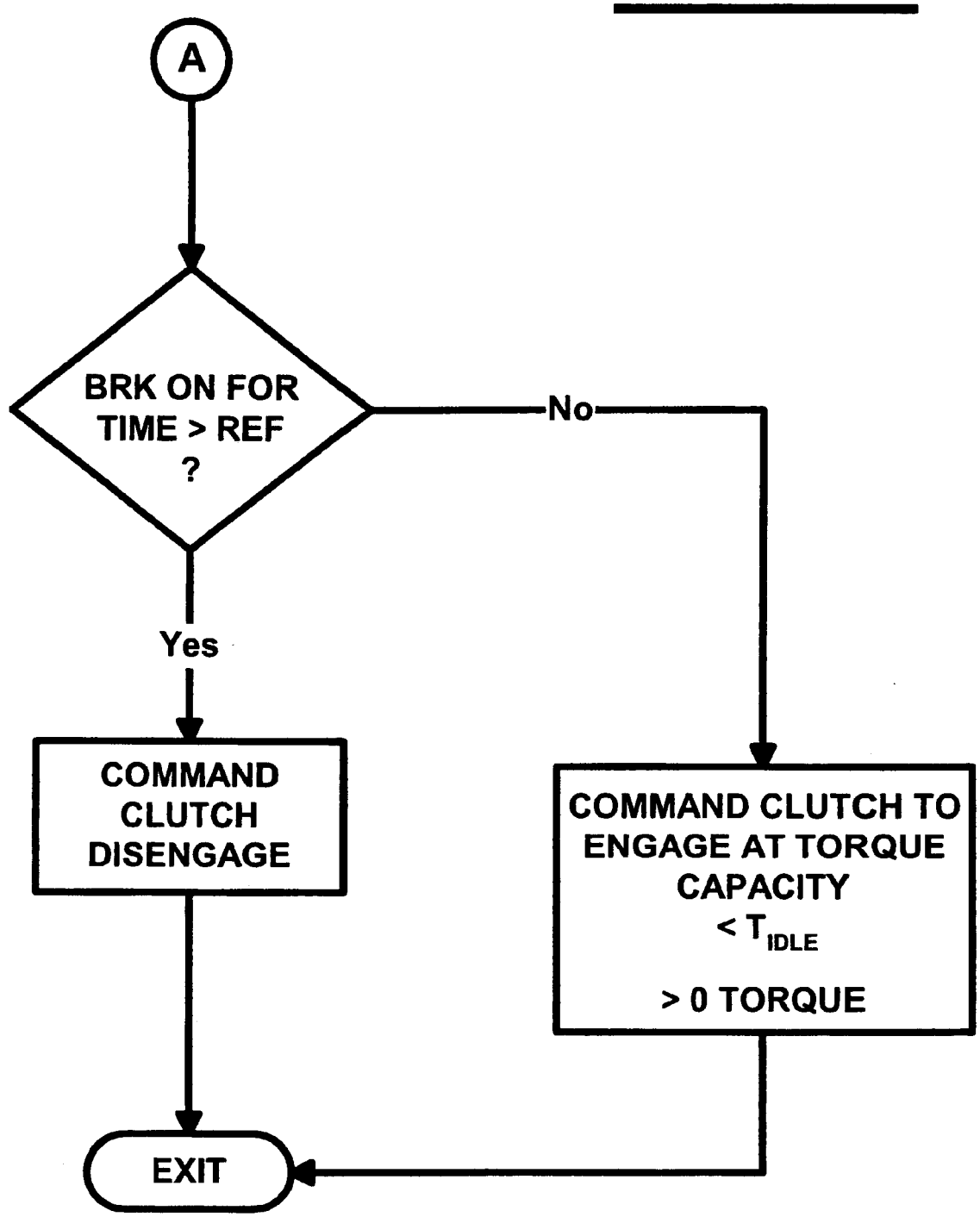
FIG. 4A is a schematic illustration, in flow chart format, of an alternative control logic.

Alternatively (see FIG. 4A), if vehicle brakes are applied when at idle conditions, the clutch may be moved to a torque transfer capacity intermediate full disengagement and idle drive torque (e.g., 40% to 60% of idle drive torque) for a short period of time (e.g., 0.2 to 0.8 seconds) prior to full disengagement thereof. Controller 34 may be provided with a timer 34A for this purpose.

By way of example, for a medium-duty vehicle (MVMA Class 6 having a GVW of 19,501 to 25,000 pounds), a flywheel torque of about 20 to 30 pound-feet will provide about 3 horsepower, which is sufficient to slowly move the vehicle on level ground if the brakes are not applied. Of course, the amount of "urge-to-move" torque transferable by the clutch must also be selected so that only acceptable wear is caused during slipping when the vehicle is initially retarded by application of the brakes.

For purposes of explaining an example of the preferred embodiment of the present invention, it is assumed that the system includes an SAE J1939-type data link, that engine speed (ES) and gross engine torque ($T_{EG}$) may be read and/or commanded on the data link and that engine flywheel torque ($T_{FW}$) is equal to gross engine torque ($T_{EG}$) minus certain friction and accessory torques ($T_p$). Using this relationship, ($T_{FW}=T_{EG}-T_p$), with a known or calculated value for parasitic torque ($T_p$), the value of gross engine torque to be requested for a desired output or flywheel torque is known.

Figure 3:
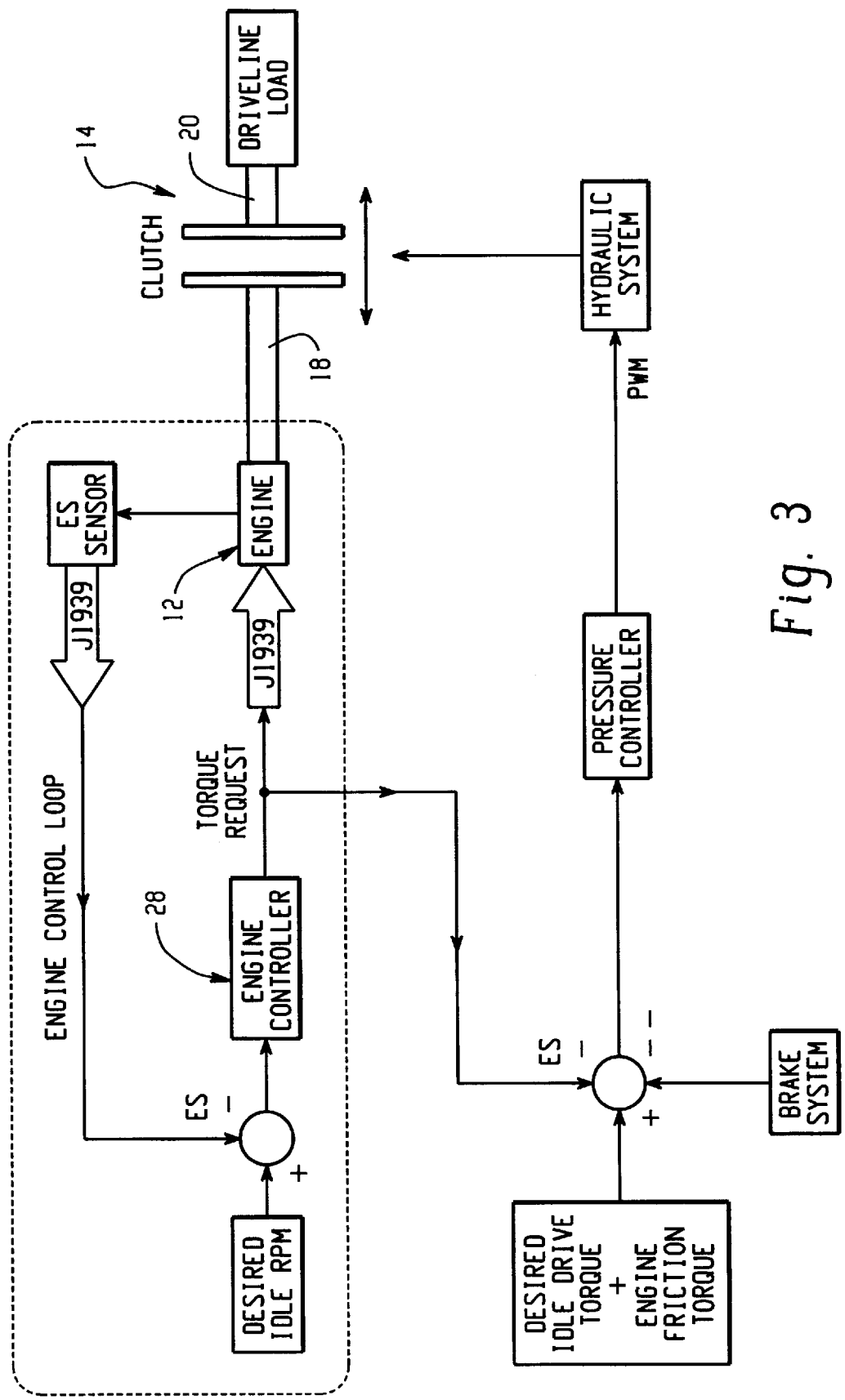
FIG. 3 is a schematic illustration of the idle drive torque master clutch control system of the present invention, which includes both hardware and software (shown in shadowed blocks).

FIG. 3 depicts the entire idle drive torque control system which comprises both hardware and software (shadowed blocks). The function of the engine control loop is to maintain (or control) the engine speed to a desired speed. To engage the clutch, the pressure controller will send a PWM command to the solenoid-actuated hydraulic system, which in turn pressurizes the clutch piston 42 to engage the clutch 14. The engaged clutch torque (especially at relatively low values, such as 0 to 50 pound-feet) is substantially directly proportional to the PWM command.

To engage the clutch to the idle drive torque level, the engine controller will first maintain the engine speed at a desired idle RPM by sending the appropriate engine torque request to the engine via the SAE J1939 communication link DL. When the engine control loop achieves its balance, the amount of torque request will be equal to that of engine friction torque (at desired idle RPM), plus the clutch torque (zero if not engaged). The system will then try to engage the clutch gradually to the level of desired idle drive torque (26 pound-feet). To do this, the system uses the value of torque request as the feedback reference. As the clutch is being engaged gradually, the load to the engine increases and, hence, slows down the engine speed. In response to the speed change, the engine controller will increase the torque request to the engine to maintain the engine speed at the desired idle RPM. When the torque request reaches the value of 26 pound-feet above engine parasitic torque ($T_{EG}=T_p+26$) and engine speed stabilizes at idle speed, the engaged clutch torque will then be equal to 26 pound-feet. The system will try to maintain the clutch engagement at this level from this point on. If for some reason the value of torque request changes (due to temperature changes or otherwise), the system will adjust the engine torque (PWM) command accordingly to maintain the torque request value at 26 pound-feet above engine parasitic torque and, hence, maintain the flywheel torque constant at 26 pound-feet.

Using commands and feedback over the SAE J1939 data link DL, with the clutch 14 disengaged (therefore, load is zero), the system will cause engine speed to stabilize at idle speed (about 850 to 900 RPM). The sensed gross engine torque at this point is equal to the parasitic torque ($T_p$). The clutch is then gradually engaged, and the engine again stabilized at idle speed until the gross engine torque equals parasitic torque plus the selected idle drive torque ($T_{EG}=T_p+T_{ID}$), at which point flywheel torque ($T_{FW}$) and the torque capacity of the clutch 14 will both equal the desired idle torque drive.

Application of the vehicle brakes will cause a large negative signal, which will cause the clutch to be disengaged.

When at a vehicle-stopped or low-speed condition (OS<REF) with the operator throttle position equaling zero, the engine will be commanded to the idle speed with a gross engine torque equaling the idle drive torque, plus the parasitic torque ($T_p+T_{ID}$), and, with the vehicle brakes not applied, or only very lightly applied, the clutch will be commanded into the idle drive torque capacity condition. The "urge-to-move" feature also may require that the transmission be engaged in low gear, an acceptable start gear, or in reverse gear. Acceptable start gears will vary with the number of forward transmission ratios, as is known.

Accordingly, it may be seen that a new and improved drive line and master dry clutch control providing an idle drive torque is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling a vehicular drive line system including a vehicle brake system, a fuel-controlled engine having an output member, a multiple-speed change-gear transmission having an input shaft drivingly coupled to said output member by a master dry friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said engine controller effective to fuel said engine to cause said engine to rotate at a selected engine speed and to develop a selected torque, a system controller for receiving input signals including signals indicative of (i) displacement of said throttle device, (ii) speed of said vehicle and (iii) application of said brake system, and for processing same according to logic rules to issue command output signals to system actuators including said clutch operator and said engine controller, said method characterized by:

(1) selecting an idle drive torque value;
(2) comparing throttle device displacement to a first reference value and vehicle speed to a second reference value;
(3) determining if the vehicle brake system is applied; and
(4) if said throttle device displacement is no greater than said first reference value, said vehicle speed is less than said second reference value, and said brake system is not applied, (i) causing said engine to rotate at a selected speed and to develop said idle drive torque at the output member thereof and (ii) causing said clutch to be engaged to have a torque transfer capacity equal to said idle drive torque.

2. The method of claim 1 wherein said idle drive torque value is selected to be sufficient to move the vehicle on level ground if the vehicle brake system is not applied, but not sufficient to move the vehicle on level ground if the vehicle brake system is applied.

3. The method of claim 1 wherein said transmission has a rated input torque capacity and said idle drive torque is less than ten percent (10%) of the rated input torque capacity of the transmission.

4. The method of claim 1 wherein said transmission has a rated input torque capacity in the range of 400 to 600 pound-feet and said idle drive torque is in the range of 20 to 40 pound-feet.

5. The method of claim 1 wherein step (3) additionally requires that said transmission be engaged in a starting gear.

6. The method of claim 1 wherein said transmission is a mechanical transmission utilizing positive jaw clutches.

7. The method of claim 1 wherein step (4) additionally requires that said transmission be engaged in one of a low speed ratio and a reverse ratio.

8. The method of claim 1 wherein said system controller is microprocessor-based and said engine controller communicates with an electronic data link conforming to the protocols of one of SAE J1922, SAE J1939 and/or ISO 11898.

9. The method of claim 1 wherein said first reference value equals about zero throttle displacement.

10. The method of claim 1 wherein said second reference value equals about 3 MPH (about 5 KPH).

11. The method of claim 1 wherein said selected engine speed is the preselected idle speed of said engine.

12. The method of claim 1 wherein said engine controller may be commanded to cause said engine to generate an engine torque ($T_{EG}$), torque at the engine output ($T_{FW}$) is equal to gross engine torque minus parasitic engine torque ($T_{FW}=T_{EG}-T_p$), and parasitic engine torque at a given engine speed is determined by a lookup table which uses the information of engine friction torque (via SAE J1939) as an input to the table.

13. The method of claim 1 further characterized by:

(5) if said throttle device displacement is no greater than said first reference value, said vehicle speed is less than said second reference value, and said brake system is applied, causing said clutch to be disengaged.

14. The method of claim 13 wherein step (3) additionally requires that said transmission be engaged in a starting gear.

15. The method of claim 1 further characterized by:
   (5) if said vehicle brake system is applied, determining the length of time the brakes have been applied;
   (6) if said throttle device displacement is no greater than said first reference value, said vehicle speed is less than said second reference value, and said brake system is applied for less than a reference period of time, (i) causing said engine to rotate at a selected speed and to develop said idle drive torque at the output member thereof and (ii) causing said clutch to be engaged to have a torque transfer capacity greater than zero torque but less than said idle drive torque; and
   (7) if said throttle device displacement is no greater than said first reference value, said vehicle speed is less than said second reference value, and said brake system is applied for at least said reference period of time, (i) causing said engine to rotate at a selected speed and to develop said idle drive torque at the output member thereof and (ii) causing said clutch to be fully disengaged.

16. The method of claim 15 wherein step (3) additionally requires that said transmission be engaged in a starting gear.

17. The method of claim 1 further characterized by:
   (5) if said throttle device displacement is no greater than said first reference value, said vehicle speed is less than said second reference value, and said brake system is applied, (i) causing said engine to rotate at a selected speed and to develop a selected drive torque at the output member thereof and (ii) causing said clutch to be engaged to have a torque transfer capacity greater than zero torque but less than said idle drive torque.

18. The method of claim 17 wherein step (3) additionally requires that said transmission be engaged in a starting gear.

19. A vehicular drive line system including a vehicle brake system, a fuel-controlled engine having an output member, a multiple-speed, change-gear transmission having an input shaft drivingly coupled to said output member by a master dry friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said controller effective to fuel said engine to cause said engine to rotate at a selected engine speed and to develop a selected torque, a system controller for receiving input signals including signals indicative of (i) displacement of said throttle device, (ii) speed of said vehicle, and (iii) application of said brake system, and for processing same according to logic rules to issue command output signals to system actuators including said clutch operator and said engine controller, said system characterized by said logic rules including rules for:
   (1) storing a preselected idle drive torque value;
   (2) comparing throttle device displacement to a first reference value and vehicle speed to a second reference value;
   (3) determining if the vehicle brake system is applied; and
   (4) if said throttle device displacement is no greater than said first reference value, said vehicle speed is less than said second reference value, and said vehicle brake system is not applied, (i) causing said engine to rotate at a selected speed and to develop said idle drive torque at the output member thereof and (ii) causing said clutch to be engaged to have a torque transfer capacity equal to said idle drive torque.

20. The system of claim 19 wherein said idle drive torque value is selected to be sufficient to move the vehicle on level ground if the vehicle brake system is not applied, but not sufficient to move the vehicle on level ground if the vehicle brake system is applied.

21. The system of claim 19 wherein said transmission has a rated input torque capacity and said idle drive torque is less than ten percent (10%) of the rated input torque capacity of the transmission.

22. The system of claim 19 wherein said transmission has a rated input torque capacity in the range of 400 to 600 pound-feet and said idle drive torque is in the range of 20 to 40 pound-feet.

23. The system of claim 20 wherein the logic rule (3) additionally requires that said transmission be engaged in a starting gear.

24. The system of claim 19 wherein said transmission is a mechanical transmission utilizing positive jaw clutches.

25. The system of claim 19 wherein said system controller is microprocessor-based and said engine controller communicates with an electronic data link conforming to the protocols of one of SAE J1922, SAE J1939 or ISO 11898.

26. The system of claim 19 wherein said first reference value equals about zero throttle displacement.

27. The system of claim 19 wherein said second reference value equals about 3 MPH.

28. The system of claim 19 wherein said selected engine speed is the preselected idle speed of said engine.

29. The system of claim 19 including the additional logic rules for:
   (5) if said throttle device displacement is no greater than said first reference value, said vehicle speed is less than said second reference value, and said brake system is applied, (i) causing said engine to rotate at a selected speed and (ii) causing said clutch to be disengaged.

30. The system of claim 19 including the additional logic rules for:
   (5) if said vehicle brake system is applied, determining the length of time the brakes have been applied;
   (6) if said throttle device displacement is no greater than said first reference value, said vehicle speed is less than said second reference value, and said brake system is applied for less than a reference period of time, (i) causing said engine to rotate at a selected speed and to develop a selected drive torque at the output member thereof and (ii) causing said clutch to be engaged to have a torque transfer capacity greater than zero torque but less than said idle drive torque; and
   (7) if said throttle device displacement is no greater than said first reference value, said vehicle speed is less than said second reference value, and said brake system is applied for at least said reference period of time, causing said clutch to be fully disengaged.

31. The system of claim 19 including the additional logic rules for:
   (5) if said throttle device displacement is no greater than said first reference value, said vehicle speed is less than said second reference value, and said brake system is applied, (i) causing said engine to rotate at a selected speed and to develop a selected drive torque at the output member thereof and (ii) causing said clutch to be engaged to have a torque transfer capacity greater than zero torque but less than said idle drive torque.

* * * * *